United States Patent [19]
Koga et al.

[11] Patent Number: 5,775,784
[45] Date of Patent: Jul. 7, 1998

[54] BRAKING CONTROL SYSTEM FOR ELECTRIC AUTOMOBILE

[75] Inventors: Hisamitsu Koga; Naotake Kumagai; Tomiji Owada; Nobuya Furukawa; Masaaki Kato; Nobuyuki Kawamura, all of Tokyo, Japan

[73] Assignee: Mitsubishi Jidosha Kogyo Kabushiki Kaisha, Tokyo, Japan

[21] Appl. No.: 682,748
[22] PCT Filed: Nov. 28, 1995
[86] PCT No.: PCT/JP95/02423
  § 371 Date: Sep. 19, 1996
  § 102(e) Date: Sep. 19, 1996
[87] PCT Pub. No.: WO96/16831
  PCT Pub. Date: Jun. 6, 1996

[30] Foreign Application Priority Data

Nov. 29, 1994 [JP] Japan .................. 6-294378

[51] Int. Cl.$^6$ .................................. B60L 7/10
[52] U.S. Cl. .................. 303/152; 303/3; 303/122; 303/122.11
[58] Field of Search ............. 303/152, 151, 303/3, 15, 20, 122, 122.09, 122.11

[56] References Cited

U.S. PATENT DOCUMENTS

| 3,924,902 | 12/1975 | Engle | 303/152 X |
| 5,378,053 | 1/1995 | Patient et al. | 303/152 X |
| 5,573,312 | 11/1996 | Muller et al. | 303/152 X |

Primary Examiner—Peter M. Poon

[57] ABSTRACT

This invention relates to a braking control system for an electric automobile that runs by driving wheels with an electric motor. The braking control system controls braking of a vehicle through regenerative braking by the motor. Upon application of brakes, the braking control system can make combined use of mechanical braking by a mechanical brake system (11) and regenerative braking by a drive motor (2). The braking control system is designed to control regenerative braking of the motor (2) by a regenerative braking control device (12) so that greater braking force is produced when a failure in the mechanical brake system (11) is detected by a failure detection device (22) than when the mechanical brake system (11) is detected to be normal. This has made it possible to stop the vehicle surely by appropriately using regenerative braking in the event of a failure in the mechanical brake system while also making it possible to avoid or reduce an energy loss, which is caused by regenerative braking, when the mechanical brake system is normal.

7 Claims, 4 Drawing Sheets

BRAKING CONTROL SYSTEM FOR ELECTRIC AUTOMOBILE

TECHNICAL FIELD

This invention relates to an electric automobile which runs by driving wheels with an electric motor, and especially to a braking control system for an electric automobile so that braking of a vehicle is controlled relying upon regenerative braking by a motor.

BACKGROUND ART

In recent years, electric automobiles each of which drives wheels by an electric motor instead of an internal combustion engine have attracted an increasing interest from the viewpoint of prevention of air pollution and reduction of vehicle noise.

These electric automobiles easily allow so-called regenerative braking. This regenerative braking can be performed by limiting a supply of electric power to a drive motor and converting the motor into a power-generating state. At this time, a load is applied to each drive wheel so that, while braking the drive wheel, rotational energy of the drive wheel can be recovered as electric energy.

Incidentally, regenerative braking in such electric automobiles is controlled so that a regenerative torque has such characteristics as shown in FIG. 4. Described specifically, at a low motor rotational speed, application of a regenerative torque causes a vehicle to move backward after the vehicle is brought to halt subsequent to a deceleration. A large electric current is also required for inducing the regeneration so that the motor produces more heat, although recoverable electric power is small, leading to a negative effect from the standpoint of energy. To avoid these problems, control is therefore performed so that no regenerative torque is produced at a certain rotational speed (for example, $N_0$) or lower.

Techniques for producing a regenerative torque even at a low motor rotational speed have been proposed to date. For example, the technique disclosed in Japanese Patent Application Laid-Open (Kokai) No. SHO 62-95903 performs PI (proportional and integral) control so that the rotational speed of a motor becomes 0 even when the motor is in a near-stop range (low-speed range).

As a consequence, it is possible to produce a regenerative torque even at a low speed while preventing a vehicle from moving backward subsequent to stopping of the vehicle. This however results in a negative effect from the standpoint of energy because at such a low speed, electric power consumed for inducing regeneration becomes greater than recoverable electric power as mentioned above.

If regenerative braking is always applied as described above, an inconvenience therefore arises in that the coverable distance of an electric automobile is reduced. Further, production of heat by the motor also becomes a problem.

Upon applying brakes at a normal time in an electric automobile, mechanical brakes such as foot brakes are operated as in ordinary automobiles of the internal combustion type, and like an engine brake in the automobiles of the internal combustion engines, regenerative braking is applied further in addition to the mechanical brakes.

To stop a conventional electric automobile which is running at such a low speed that the rotational speed of its motor is equal to or lower than a predetermined value (for example, $N_0$), only the above-mentioned mechanical brakes are usually relied upon since it is not desired to produce a regenerative torque.

If the mechanical brakes fail, no braking force is therefore applied when the motor is at a low speed. Although it is of course possible to provide the mechanical brakes themselves with a fail-safe function, it is desired to make it possible to appropriately use regenerative braking of the electric automobile in the event of a failure in the mechanical brakes because the regenerative braking can produce a substantially large regenerative torque even at a low speed.

With the foregoing problems in view, the present invention has as an object thereof the provision of a braking control system for an electric automobile so that regenerative braking is appropriately used in the event of a failure in mechanical brakes to ensure stopping of a vehicle while making it possible to either avoid or reduce an energy loss due to regenerative braking when the mechanical brakes are normal.

DISCLOSURE OF THE INVENTION

The present invention provides a braking control system for an electric automobile, said brake control system permitting combined use of mechanical braking by a mechanical brake system and regenerative braking by a drive motor upon application of brakes, comprising failure detection means for detecting whether said mechanical brake system is normal or in failure, and regenerative braking control means for receiving a detection signal from said failure detection means upon application of said brakes and then performing control of regenerative braking by said drive motor, wherein said regenerative braking control means performs said control of regenerative braking by said drive motor so that greater braking force is produced when a failure in said mechanical brake system is detected by said failure detection means than when said mechanical brake system is detected to be normal.

Owing to such features, if the mechanical brake system is normal, regenerative braking force is reduced to perform braking based primarily on the normal mechanical brake system. This can reduce an energy loss which is associated with regenerative braking at a low speed, and can also reduce generation of heat from the motor. If the mechanical brake system is in failure, on the other hand, braking is performed by regenerative braking so that a vehicle can be stopped surely.

In addition to the above such features, said braking control system may further comprise motor rotational speed detection means for detecting a rotational speed of said motor. Upon receipt of detection signals from said failure detection means and said motor rotational speed detection means, said regenerative braking control means may perform said control of regenerative braking of said motor so that said regenerative braking is applied only in a range equal to and higher than a predetermined rotational speed of said motor when said mechanical brake system is detected to be normal but is always applied irrespective of a rotational speed of said motor when said failure is detected.

Owing to such features, if the mechanical brake system is normal, the regenerative braking is not performed when the motor is at a low rotational speed. Braking is therefore performed only by the normal mechanical brake system. This can avoid an energy loss which is associated with regenerative braking at a low speed, and can also avoid the generation of heat from the motor. If the mechanical brake system is in failure, on the other hand, regenerative braking is performed even when the motor is at a low rotational speed. By this regenerative braking, braking is conducted without failure so that the vehicle can be stopped.

The braking control system may further comprise motor rotational speed detection means for detecting a rotational speed of said motor and brake pedal stroke detection means for detecting a brake pedal stroke by a driver. Upon receipt of detection signals from said failure detection means, said motor rotational speed detection means and said brake pedal stroke detection means, said regenerative braking control means may perform the control of regenerative braking of said motor so that regenerative braking force preset corresponding to said rotational speed of said motor and said brake pedal stroke is produced when said failure is detected.

Owing to such features, if the mechanical brake means is in failure, a regenerative torque can be set corresponding to a rotational speed of the motor and a stroke of the brake pedal. It is therefore possible to apply regenerative braking force which is adequate for the rotational speed of the motor and also reflects a driver's intention of braking.

In this case, said regenerative braking control means can be designed to perform said control of regenerative braking force of said motor upon detection of said failure so that said regenerative braking force is increased more as said rotational speed of said motor becomes lower.

Owing to such features, a regenerative torque can be set corresponding to a rotational speed of the motor and a stroke of the brake pedal. It is therefore possible to apply regenerative braking force which is adequate for the rotational speed of the motor and also reflects the driver's intention of braking. In particular, if the mechanical brake means is normal, no regenerative braking is performed when the motor is at a low rotational speed. It is therefore possible to achieve easy and sure control on regenerative braking. Further, because regenerative braking is applied corresponding to an operation of the brake pedal, braking can be performed reflecting the driver's intention even if the mechanical brake system is in failure.

In addition, the regenerative braking control means can be designed to perform the control of regenerative braking of the motor so that, when said failure is detected and said rotational speed of said motor is detected to be zero, said regenerative braking torque available at a maximum value of said brake pedal stroke becomes equal to or smaller than rolling resistance of said vehicle.

Owing to such features, even if the stroke of the brake pedal is brought to the maximum value when said failure is detected and said rotational speed of said motor is detected to be zero, the resulting regenerative braking torque becomes equal to or smaller than the rolling resistance of the vehicle. This makes it possible to avoid an inconvenience such as the stopped vehicle being caused to move backward by the regenerative torque, and hence to surely and safely stop the vehicle.

Alternatively, the braking control system may further comprise gear position detecting means for detecting a gear position of a transmission mounted on said vehicle, and the regenerative braking control means may be designed to perform the control of regenerative braking of the motor so that, when said failure is detected, said regenerative braking force is increased more based on a detection signal from said gear position detecting means as said gear position has a higher gear position.

Owing to such features, a regenerative torque corresponding to a gear position can be applied. At a low vehicle speed, a stable regenerative torque can be obtained irrespective of the gear position. It is therefore possible to stably perform regenerative braking even when the mechanical brake system is in failure.

The braking control system may further comprise road grade detection means for detecting a grade of a road on which said vehicle is running. The regenerative braking control means can be designed to perform the control of regenerative braking of the motor so that based on a detection signal from said road grade detection means, said regenerative braking force is increased more as the downward grade of said road increases.

Owing to such features, large braking force which is required on a downhill can be obtained even when the mechanical brake means is in failure. The reliability of the automobile in the event of such an emergency can therefore be improved.

BRIEF DESCRIPTION OF THE DRAWINGS

FIG. 2A and 2B both illustrate maps useful in controlling braking by the braking control system according to the one embodiment of the present invention for the automobile, in which FIG. 2A shows a map for use when mechanical brake means is in failure while FIG. 2B depicts a map for use when the mechanical brake means is normal;

BEST MODE FOR CARRYING OUT THE INVENTION

Figure 1:
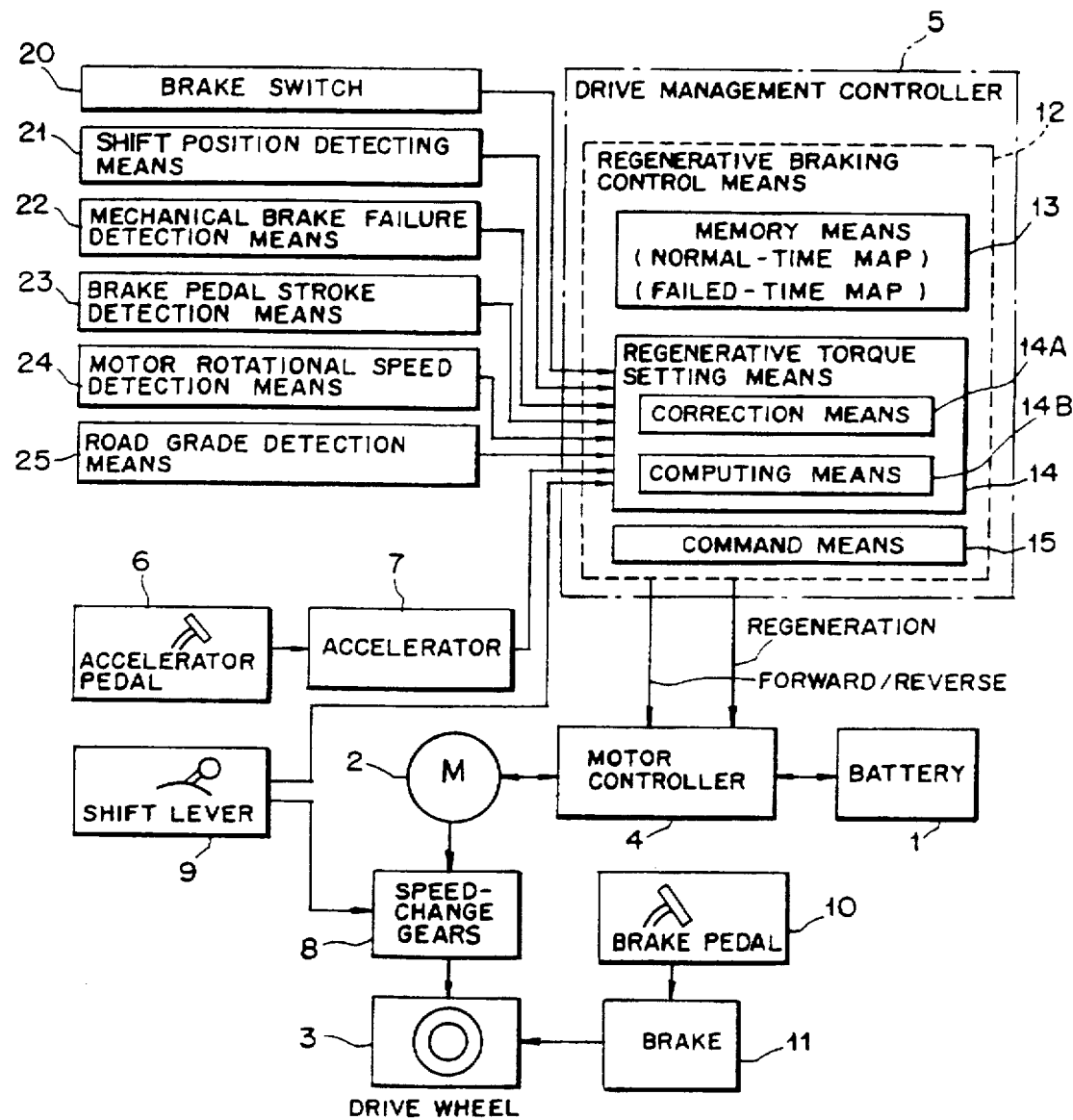
FIG. 1 is a schematic block diagram showing a braking control system according to one embodiment of the present invention for an automobile.
Figure 2A:
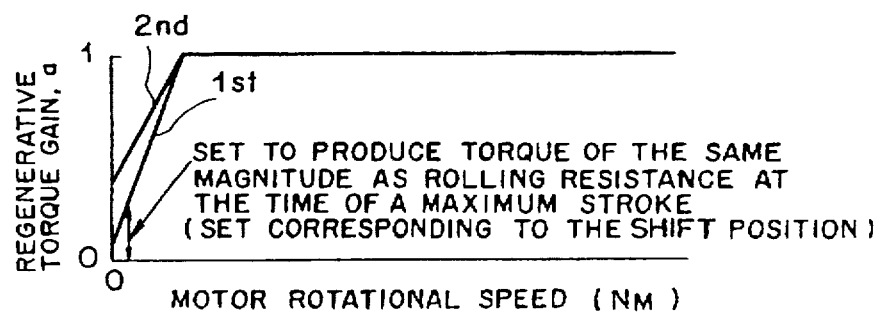
Figure 2B:
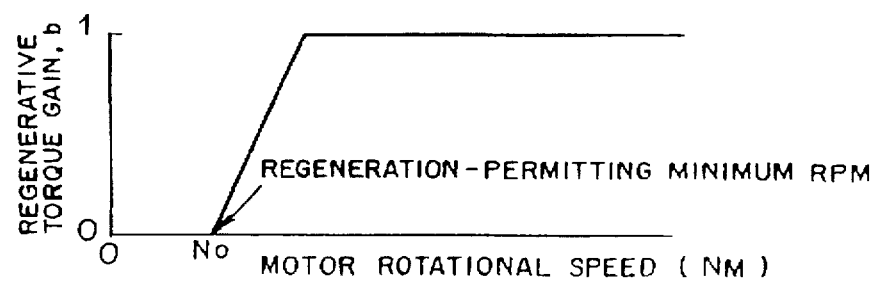
Figure 3:
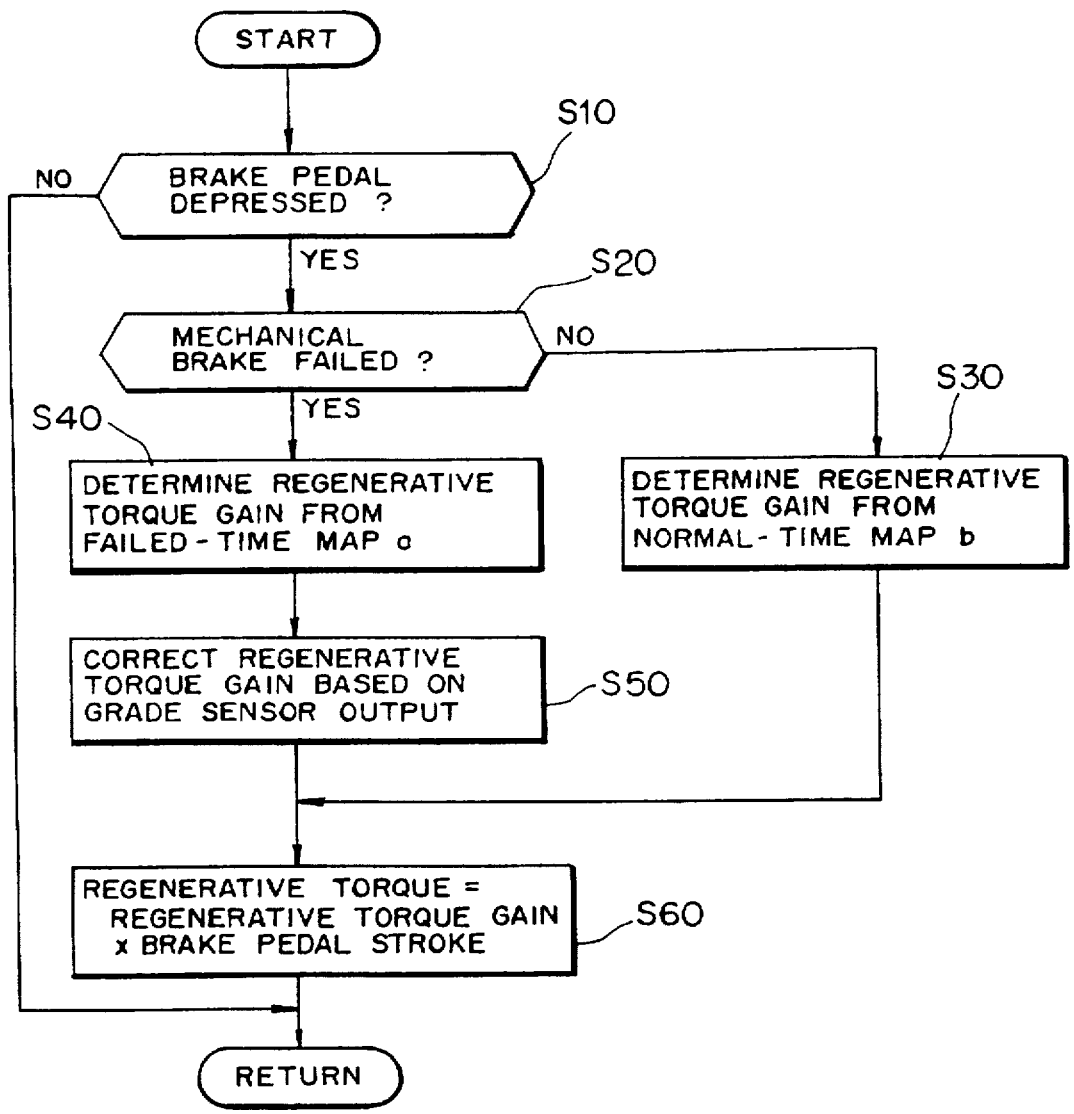
FIG. 3 is a flow chart illustrating a braking control operation by the braking control system according to the one embodiment of the present invention for the automobile.
Figure 4:
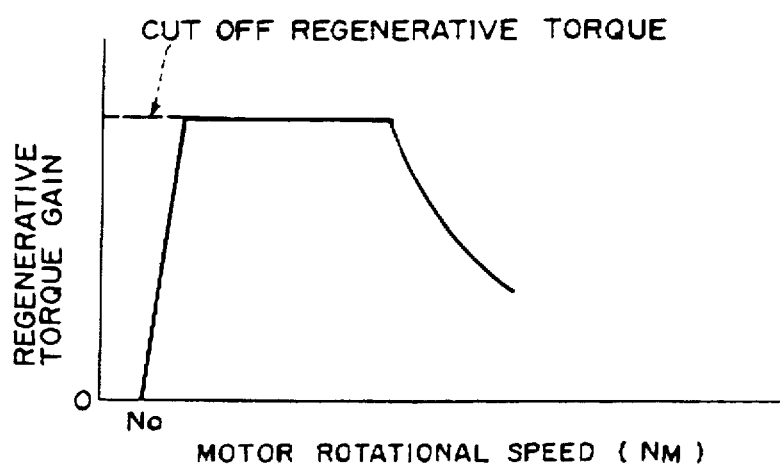
FIG. 4 is a diagram illustrating braking control characteristics of a conventional braking control system for an electric automobile.

With reference to FIG. 1 through FIG. 3, a description will hereinafter be made about the braking control system according to the one embodiment of the present invention for the automobile.

In FIG. 1, numeral 1 indicates a battery. This battery 1 is repeatedly rechargeable by an external battery charger, which is not equipped with a vehicle. Designated at numeral 2 is a drive motor to which electric power is supplied from the battery 1. By this motor 2, each drive wheel 3 of the automobile is driven. Arranged between the battery 1 and the motor 2 is a motor controller 4, through which the electric power from the battery 1 is adjusted to a predetermined level and is supplied to the motor 2.

The motor controller 4 is in turn controlled by a drive management controller 5. Described specifically, the drive management controller 5 is inputted with a stroke of an accelerator position 6 (accelerator position) through an accelerator 7 so that through the motor controller 4, an output of the motor 2 is con25 trolled primarily to conform with the accelerator position.

Further, a transmission (speed-change gear) 8 is interposed between the motor 2 and the drive wheel 3 so that a rotational speed of the motor 2 is shifted and then transmitted to the drive wheel 3. A gear position of this transmission is selected by operating a shift lever 9. In the illustrated embodiment, the transmission 8 is assumed to be a 2-forward/1-reverse transmission.

Based on a gear position selected through the shift lever 9 (selected gear position), the drive management controller 5 performs control so that, when the shift lever 9 is set in the forward range, the motor is rotated forward corresponding to an accelerator position but, when the shift lever 9 is set in the reverse range, the motor is reversed corresponding to an accelerator position. Information on the gear position selected by the shift lever 9 is inputted from a gear position detecting means (selector switch or the like) 21, which serves to detect the gear position, to the drive management controller 5. In the reverse range, the speed-change gears themselves are set at a 1st speed.

This electric automobile is also designed in such a way that, when a brake pedal 10 is depressed, braking is applied by a mechanical brake system (hereinafter called the "mechanical brake" or simply the "brake") 11 and regenerative braking is also performed by the motor 2. Control of this regenerative braking is effected by a regenerative braking control function unit (regeneration control means) 12, which is arranged in the drive management controller 5, on the basis of information on detection of an actuation of brakes (information indicative of an "on" position of a brake switch 20) from the brake switch 20. Depending on whether the brake is normal or is in failure, this regenerative control means 12 controls a regenerative torque, which is produced by the motor 2, in accordance with a brake pedal stroke, a revolution speed $N_M$ of the motor 2 and a gear position of the transmission 8 or shift lever 9.

A description will now be made of the regenerative control means 12. This regenerative control means 12 is provided with a memory unit (memory means) 13, a regenerative torque setting unit 14 and a command unit (command means) 15.

Among these, the memory unit 13 stores a failed-time map and a normal-time map to be described subsequently herein. The regenerative torque setting unit 14 is provided with computing means 14A and correction means 14B. The computing means 14A computes a target regenerative torque from various detection information and the maps stored in the memory unit 13. However, a regenerative torque gain which is employed at the computing means 14A is suitably corrected by the correction means 14B. Further, the command unit 15 outputs a command signal to the motor control 4 in accordance with a value of regenerative torque so set.

The failed-time map and normal-time map stored in the memory unit 13 are maps which make it possible to set a regenerative torque gain in accordance with a motor rotational speed $N_M$ as is illustrated in FIGS. 2A and 2B.

Of these, the normal-time map defines a lower limit $N_0$ of motor rotational speeds capable of producing regenerative torques, a regeneration-permitting minimum rpm, as shown in FIG. 2B. If the motor rotational speed $N_M$ drops to or below this lower limit $N_0$, the regenerative torque gain becomes 0 so that no regenerative torque is produced. As the motor rotational speed $N_M$ exceeds this lower limit $N_0$, the regenerative torque gain gradually increases and then remains at a maximum value (=1) in a medium-speed range.

As mentioned above, when the motor rotational speed $N_M$ is low, a large electric current is required for regeneration, thereby inducing the generation of heat from the motor and an energy loss. It is to avoid these problems that no regenerative braking is performed in the low range of motor rotational speeds $N_M$ as described above. By gradually increasing the regenerative torque gain with the motor rotational speed $N_M$, the regenerative torque is prevented from suddenly changing relative to the motor rotational speed $N_M$, thereby permitting smooth control of generative braking.

On the other hand, the failed-time map provides a certain regenerative gain even when the motor rotational speed $N_M$ drops to 0, that is, the motor 2 stops rotation as illustrated in FIG. 2A. Even when the motor 2 is at a low speed (namely, when the automobile is at a low speed) or even when the motor 2 is stopped (namely, when the automobile is stopped), braking force is therefore produced by regenerative braking instead of braking force by the brake 11 so that the vehicle can be braked or stopped.

This failed-time map is designed so that the regenerative torque gain remains at a maximum value (=1) in the low and medium speed ranges of the motor rotational speed $N_M$ but gradually decreases when the motor rotational speed $N_M$ approaches 0. Accordingly, the regenerative torque gain becomes minimum when the motor rotational speed $N_M$ is 0. This is to make a regenerative torque equal to or lower than the rolling resistance of the vehicle around the motor rotational speed $N_M=0$ so that the vehicle at a stop is prevented from moving backward. When the motor rotational speed $N_M$ increases from 0, the vehicle obviously becomes less likely to move backward. The regenerative torque gain hence gradually increases to reach the maximum value so that vehicle braking force can be obtained as needed.

In the failed-time map, the regenerative torque gain around the motor rotational speed $N_M=0$ is set depending on the gear position. Described specifically, the regenerative torque gain around the motor rotational speed $N_M=0$ is set greater for the higher gear position (the 2nd speed) than for the lower gear position (the 1st speed), because the force applied to the drive wheels becomes smaller at the higher gear position of a higher gear ratio than at the lower gear position of a lower gear ratio so that to obtain a similar regenerative torque, the regenerative torque gain has to be made greater at the higher gear position than at the lower gear position. At the motor rotational speed $N_M=0$, the regenerative torque gain for the higher gear position and that for the lower gear position therefore correspond to their gear ratios, respectively.

The computing means 14A is inputted with detection information from failure detection means 22 arranged for the detection of a failure in the mechanical brake system, detection information on a stroke of the brake pedal 5 (brake pedal stroke) from brake pedal stroke detection means 23, detection information on a rotational speed (the number of rotations) $N_M$ of the motor 2 from motor rotational speed detection means 24 and information of a gear position of the transmission from the gear position detecting means 21, and based on these failure information, brake pedal stroke information, motor rotational speed information and gear position information and the map stored in the memory unit 13, computes a target regenerative torque.

The failure detection means 22 can detect whether the brake is normal or in failure, for example, from the degree of a deceleration of the vehicle relative to an operation degree of the brake (namely, a stroke of the brake pedal). In this case, the brake pedal stroke is detected by the brake pedal stroke detection means 23 whereas the degree of the deceleration of the vehicle is calculated relying upon a vehicle speed sensor (not shown) which is often mounted on the vehicle.

The computing means 14A uses the failed-time map stored in the memory unit 13 when the brake 11 is in failure, but employs the normal-time map stored in the memory unit 13 during normal operation of the brake 11. Corresponding to a rotational speed (the number of rotations) $N_M$ of the motor 2 and a shift position (gear position), a regenerative torque gain is then determined from the corresponding map. By computing the product of this regenerative torque gain and a brake pedal stroke, a regenerative torque is determined.

As the regenerative torque is proportional to the brake pedal stroke as mentioned above, the regenerative torque becomes maximum when the brake pedal stroke becomes maximum, provided that the motor rotational speed is the same. The regenerative torque gain at the motor rotational speed $N_M=0$ in the above-described failedtime map is therefore set so that, even if the brake pedal is operated over its maximum stroke and the regenerative torque becomes the maximum, the regenerative torque does not exceed the rolling resistance of the vehicle.

The correction means 14b receives detection information on the grade of a road from road grade detection means 25, and corrects a regenerative torque gain so that the regenerative torque gain becomes greater as the downhill grade of the road increases but conversely, the regenerative torque gain becomes smaller as the road becomes more uphill. Further, no correction is effected when a road is flat.

Accordingly, the computing means 14A computes a regenerative torque by using a regenerative torque gain which has been subjected, as needed, to such a correction as described above.

In accordance with a command from the command means 15, a regenerative torque is controlled through the motor controller 4.

As the braking control system according to the one embodiment of the present invention for the electric automobile is constructed as described above, setting of its regenerative torque is performed, for example, as illustrated in FIG. 3.

Namely, it is first detected from brake switch information whether the brake pedal 10 has been depressed (step S10). If the brake pedal 10 is not detected to have been depressed, no regeneration control is performed. If the brake pedal 10 is however detected to have been depressed, the routine then advances to step S20, where it is determined whether there was a failure in the mechanical brake 11.

Unless there is a failure in the mechanical brake 11 (in other words, if the mechanical brake is normal), the routine then advances to step S30, where the normal-time map b is selected by the computing means 14A and a regenerative torque gain corresponding to a motor rotational speed $N_M$ is determined from this normal-time map b. If there is a failure in the mechanical brake 11, on the other hand, the routine advances to step S40, where the failed-time map a is selected by the computing means 14A and a regenerative torque gain corresponding to a motor rotational speed $N_M$ is determined from this failed-time map a.

The routine then advances to step S50, where the regenerative torque gain is corrected by the correction means 14B on the basis of a road grade from the road grade detection means 25. This correction is performed in such a way that, when the road is a downhill, the regenerative torque gain is corrected to become greater as the descending grade becomes steeper but, when the road is an uphill, the regenerative torque gain is corrected to become smaller as the ascending grade becomes steeper.

In step S60, the regenerative torque gain determined in step S30 or S50 is multiplied by a brake pedal stroke detected by the brake pedal stroke detection means 23 so that a regenerative torque is set.

After a regenerative torque has been set as described above, the regeneration of the motor is controlled through the motor controller 4 so that the regenerative torque so set is achieved.

As a consequence, when the mechanical brake is normal, no regenerative braking is performed on the basis of the normal-time map b shown in FIG. 2B when the motor 2 is at a low speed. Normally, it is therefore possible to prevent the generation of heat from the motor and to keep the equipment in good condition, and owing to avoidance of an energy loss, further to ensure a sufficient coverable distance for the automobile.

When the mechanical brake is in failure, on the other hand, regenerative braking is performed based on the failed-time map a shown in FIG. 2A even when the motor 2 is at a low speed. Braking and stopping of the vehicle can therefore be achieved without failure while the motor produces regenerative braking force in place of the mechanical brake 11 until the vehicle stops. It is therefore possible to provide the automobile with improved reliability in the event of such an emergency.

Further, the regenerative braking force at the failed time is set so that the regenerative torque becomes equal to or smaller than the rolling resistance of the vehicle without exception especially when the vehicle is at a stop. The vehicle at the stop is therefore surely prevented from such a problem as moving backward, and can be safely stopped. By gradually increasing the regenerative torque gain with the motor rotational speed $N_M$, the regenerative torque is preventing from suddenly changing relative to the motor rotational speed $N_M$ so that smooth control of regenerative braking can be performed.

Further, the regenerative braking force at the failed time is corrected in accordance with the grade of a road so that on a downhill, the regenerative braking force is increased in accordance with the steepness of the descent and on an uphill, the regenerative braking force is reduced in accordance with the steepness of the ascent. It is therefore possible to ensure braking force corresponding to each downhill or uphill. Owing to the regenerative braking force enhanced especially on a downhill, sufficient braking force can be secured on the downhill although this is the most serious problem when the mechanical brake fails. The reliability of the automobile in the event of such an emergency has therefore been improved further.

In the above-described embodiment, it is designed to perform no regenerative braking at a low speed of the motor 2 when the mechanical brake 11 is normal but to perform regenerative braking even at a low speed of the motor 2 when the mechanical brake 11 is in failure. It is also possible to achieve the prevention of production of heat from the motor and the maintenance of the equipment to certain extents by performing regenerative braking while limiting the production of regenerative braking force instead of completely preventing regenerative braking even at a low speed of the motor 2 when the mechanical brake is normal. This also makes it possible to provide the automobile with a sufficient coverable distance owing to the reduction of the energy loss.

In this case, greater regenerative braking force can be produced when the mechanical brake 11 is in failure than when the mechanical brake 11 is normal, whereby regenerative force sufficient to replace the mechanical brake 11 can be produced until the vehicle stops. This makes it possible to perform accurate braking and stopping of the automobile. It is therefore possible to provide the automobile with improved reliability in the event of such an emergency.

In the above-described embodiment, a regenerative torque gain is set based on one of the maps and a regenerative torque is then determined from the regenerative torque gain. It is however not absolutely necessary to use such maps.

Namely, a regenerative torque can be determined in accordance with a motor rotational speed, a brake pedal stroke, a grade and the like by using a computing equation of similar setting characteristics of regenerative torques as the above-described maps or by storing in certain memory means such setting characteristics of regenerative torques as those shown in the maps and using such characteristics.

The transmission 8 is not limited to the two-speed transmission. Even a transmission having a greater number of speeds can still bring about similar effects as the above-described embodiment by providing the failed-time map with regenerative torque gains set for the individual gear positions in the low motor rotational speed range.

CAPABILITY OF EXPLOITATION IN INDUSTRY

According to the braking control system of the present invention for the electric automobile, greater regenerative braking is applied by the drive motor when the mechanical brake system is in failure than when the mechanical brake system is normal. Even when the mechanical brake system is in failure, it is therefore still possible to ensure braking performance by regenerative braking force of the drive motor in the event of such an emergency of the automobile while making it possible to avoid or reduce a regenerative-braking-induced energy loss when the mechanical brake system is normal. This has made it possible to provide the electric automobile with improved reliability.

We claim:

1. A braking control system for an electric automobile, said brake control system permitting combined use of mechanical braking by a mechanical brake system (11) and regenerative braking by a drive motor (2) upon application of brakes, comprising:

failure detection means (22) for detecting whether said mechanical brake system (11) is normal or in failure, and regenerative braking control means (12) for receiving a detection signal from said failure detection means (22) upon application of said brakes and then performing control of regenerative braking by said drive motor (2);

wherein said regenerative braking control means (12) performs said control of regenerative braking by said drive motor (2) so that greater braking force is produced when a failure in said mechanical brake system (11) is detected by said failure detection means (22) than when said mechanical brake system (11) is detected to be normal.

2. The braking control system according to claim 1, wherein said braking control system further comprises motor rotational speed detection means (24) for detecting a rotational speed of said motor (2); and upon receipt of detection signals from said failure detection means (22) and said motor rotational speed detection means (24), said regenerative braking control means (12) performs said control of regenerative braking of said motor (2) so that said regenerative braking is applied only in a range equal to and higher than a predetermined rotational speed of said motor (2) when said mechanical brake system (11) is detected to be normal but is always applied irrespective of a rotational speed of said motor (2) when said failure is detected.

3. The braking control system according to claim 1, wherein said braking control system further comprises motor rotational speed detection means (24) for detecting a rotational speed of said motor (2) and brake pedal stroke detection means (23) for detecting a brake pedal stroke by a driver; and upon receipt of detection signals from said failure detection means (22), said motor rotational speed detection means (24) and said brake pedal stroke detection means (23), regenerative braking of said motor (2) is controlled so that regenerative braking force preset corresponding to said rotational speed of said motor and said brake pedal stroke is produced when said failure is detected.

4. The braking control system according to claim 3, wherein upon detection of said failure, said regenerative braking control means (12) performs said control of regenerative braking force of said motor (2) so that said regenerative braking force is increased more as said rotational speed of said motor (2) becomes lower.

5. The braking control system according to claim 3, wherein, when said failure is detected and said rotational speed of said motor (2) is detected to be zero, said regenerative braking control means (12) performs said control of regenerative braking of said motor (2) so that said regenerative braking torque available at a maximum value of said brake pedal stroke becomes equal to or smaller than rolling resistance of said vehicle.

6. The braking control system according to claim 3, wherein said braking control system further comprises gear position detecting means (21) for detecting a gear position of a transmission mounted on said vehicle; and, when said failure is detected, said regenerative braking control means (12) performs said control of regenerative braking of said motor (2) so that based on a detection signal from said gear position detecting means (21), said regenerative braking force is increased more as said gear position has a higher gear position.

7. The braking control system according to claim 3, wherein said braking control system further comprises road grade detection means (25) for detecting a grade of a road on which said vehicle is running; and based on a detection signal from said road grade detection means (25), said regenerative braking control means (12) performs said control of regenerative braking of said motor (2) so that said regenerative braking force is increased more as a downhill grade of said road increases.

* * * * *